Feb. 23, 1937.  E. L. HARDER  2,071,833
ALTERNATING CURRENT COMPENSATOR
Filed Nov. 29, 1935
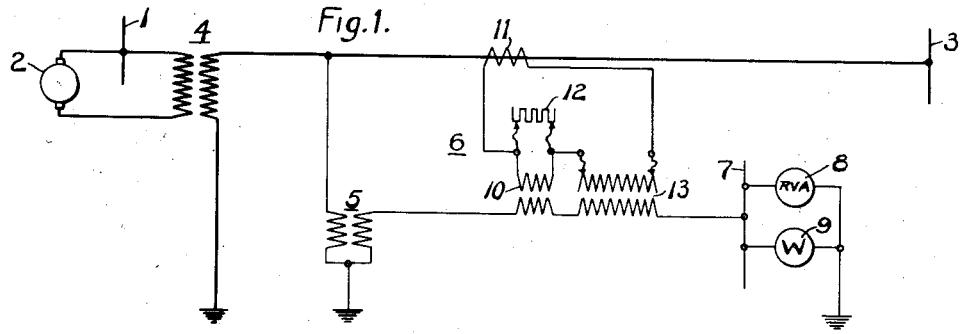
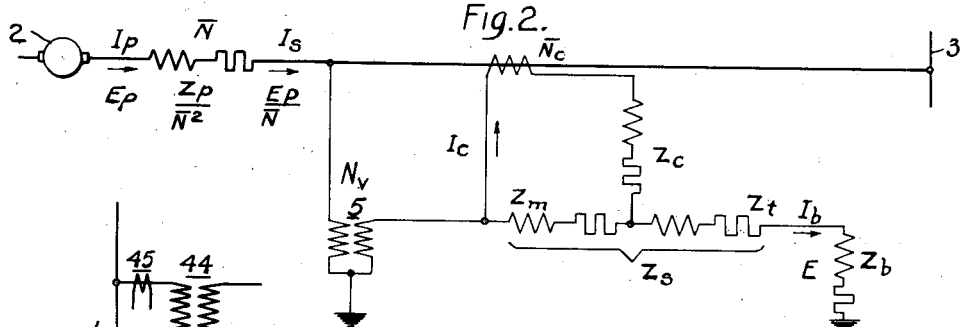
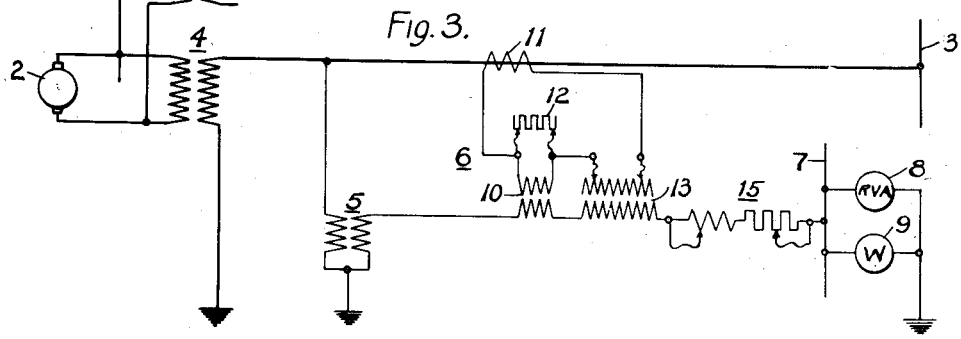
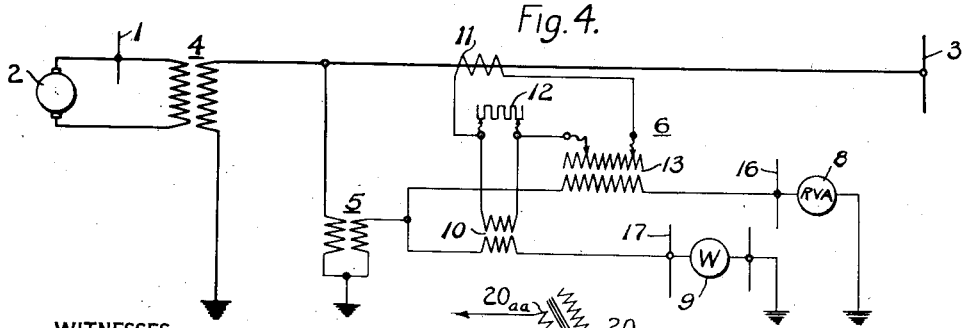
WITNESSES:
C. N. Evans
G. O. Harrison
INVENTOR
Edwin L. Harder
BY
ATTORNEY Patented Feb. 23, 1937

2,071,833

UNITED STATES PATENT OFFICE 2,071,833

ALTERNATING-CURRENT COMPENSATOR

Edwin L. Harder, Forest Hills, Pa., assignor to Westinghouse Electric & Manufacturing Company, East Pittsburgh, Pa., a corporation of Pennsylvania Application November 29, 1935, Serial No. 52,122

6 Claims. (Cl. 171—97)

My invention relates to compensators for use with alternating-current power apparatus, and particularly, to such compensators for correcting the impedance effects of power transformers on metering variables derived from the transformer low voltage circuits, so as to provide accurate measurement of high-voltage quantities without the use of high-voltage measuring apparatus.

In compensators as heretofore proposed for such applications, the series impedance effects of the power transformers have been offset by means of a compensator impedance, through which a current proportional to the power transformer primary or secondary current is circulated. In such compensators, however, the burden current of the potential circuit traverses the compensator impedance and produces a voltage drop therein which appears as an error in the meter reading.

This error is a function of line voltage but is substantially independent of line current. When wattmeters or reactive volt-ampere meters are used, the error may be offset by calibration and lag adjustments provided on the individual meters. Alternatively, the error may be minimized by reducing the compensator impedance to a low value. However, reduction of the compensator impedance requires the use of oversize current transformers and other departures from customary metering practice.

Because of the complications involved, the known methods of correction for the error mentioned above have not proved commercially feasible, and it is an object of my invention to provide a novel compensating system in which the error may be reduced to negligible value or completely eliminated from the meter bus voltage.

Other objects of my invention will become evident from the following detailed description taken in conjunction with the accompanying drawing, in which:

Figure 1 is a diagrammatic view of a power transformer circuit and compensating system of the prior art.

Fig. 2 is an impedance diagram of the circuit shown in Fig. 1.

Fig. 3 is a diagrammatic view of a power transformer circuit and compensating system embodying my invention, and Fig. 4 is a diagrammatic view of a modification of the system shown in Fig. 3.

Fig. 5 is a diagrammatic view of a modified potential transformer arrangement which may be substituted for the potential transformer 5 of Fig. 3.

Referring to Fig. 1, a high voltage bus 1 is energized from any suitable alternating-current source, shown as a generator 2, and is connected to a low-voltage bus 3 by means of a power transformer 4. A potential transformer 5 is connected to the secondary circuit of the power transformer 4 to provide a suitable low voltage, of the order of 110 volts, for example, for metering and relaying purposes. The secondary circuit of the potential transformer 5 is connected, in series with a compensator denoted generally at 6, to a metering bus 7. Suitable translating devices, shown as a reactive volt-ampere meter 8 and a wattmeter 9, are connected for voltage energization to the metering bus 7. It will be understood that the meters 8 and 9 are provided with suitable apparatus and connections (not shown) for obtaining current energization from the high-tension circuit of the power transformer 4 in well known manner.

The compensator 6 is energized by means of a current transformer 11 from the secondary circuit of the transformer 4, and is designed to introduce a voltage drop in the secondary circuit of the potential transformer 5 equivalent at all times to the leakage impedance voltage drop in the power transformer 4, reduced through the turn ratios of the power transformer 4 and potential transformer 5. The compensator 6 consists of an adjustable reactance section 13 and an adjustable resistance section 12, constituting a mutual impedance which couples the secondary circuit of the current transformer 11 to the secondary circuit of the potential transformer 5. The resistance section 12 and the reactance section 13 are individually designed to produce voltage proportional to the total reactance drop and the total resistance drop respectively, of the power transformer 4. Provision is made to reduce the resistance of the resistance section 12 by the resistance unavoidably and inherently found in the reactance section 13.

In order to reduce the impedance of the compensator 6 to the burden current supplied to the metering bus 7, so far as practical, without imposing an excessive burden on the current transformer 11, the reactance section 13 is constructed as a two-winding device having a ratio of approximately 10:1. Similarly, the resistance section 12 is inductively coupled to the secondary circuit of potential transformer 5, by means of an auxiliary potential transformer 10 having a ratio of 10:1.

The operation of the circuit of Fig. 2 may better be understood by considering the circuit analytically. In the following, capital letters are used to denote complex quantities, lower case letters are used as subscripts, scalar quantities are denoted by capital letters surmounted by a bar, and the conjugate of any complex quantity is denoted by the corresponding capital letter surmounted by a circumflex accent.

Let $E_p$ = primary terminal voltage of transformer 4
$E_s$ = secondary terminal voltage of transformer 4
$I_p$ = primary current voltage of transformer 4
$I_s$ = secondary current voltage of transformer 4
$Z_1$ = equivalent series impedance of transformer 4 considered from its primary circuit
$\overline{N}$ = turn ratio of transformer 4
$I_c$ = secondary current of current transformer 11
$\overline{N}_c$ = turn ratio of current transformer 11
$Z_m$ = mutual impedance of compensator 6
$Z_c$ = primary leakage-impedance of compensator 6
$Z_t$ = secondary leakage-impedance of compensator 6
$Z_s$ = equivalent impedance of compensator 6 to burden current in the secondary circuit of potential transformer 5
$I_b$ = burden current
$Z_b$ = burden impedance
$E$ = voltage at potential bus 7
$\overline{N}_v$ = turn ratio of potential transformer 5 without correction for burden
$\overline{N}_{vv}$ = corrected turn ratio of potential transformer 5

Considering the impedances of the compensator circuit, the mutual impedance of the current transformer 11 is many times as large as any of the quantities $Z_m$, $Z_c$, $Z_t$ or $Z_s$. The secondary circuit of the current transformer 11, accordingly, diverts a negligible part of the burden current $I_b$, and the compensator network, considered from the burden current circuit, may be regarded as open-circuited at the current transformer 11.

The total impedance of the compensator to burden current may, therefore, be approximated as $$Z_s = Z_m + Z_t \quad (1)$$

The voltage relationship in the secondary circuit of potential transformer is $$E = \frac{E_s}{\overline{N}_v} + I_c Z_m - I_b Z_s \quad (2)$$

The voltage relationship in the power transformer 4 is $$E_s = \frac{E_p - I_p Z_p}{\overline{N}} \quad (3)$$

And the current relationship, neglecting exciting current is $$I_s = \overline{N} I_p \quad (4)$$

The relationship of currents in the current transformer 11 is $$I_c = \frac{I_s}{\overline{N}_c} \quad (5)$$

Substituting (4) in (5)

$$I_c = \frac{\overline{N}}{\overline{N}_c} I_p \quad (6)$$

Substituting (3) and (6) in (2)

$$E = \frac{E_p - I_p Z_p}{\overline{N}\overline{N}_v} + \frac{\overline{N}}{\overline{N}_c} I_p Z_m - I_b Z_s \quad (7)$$

However, $$Z_m = \frac{Z_p \overline{N}_c}{\overline{N}^2 \overline{N}_v} \quad (8)$$

Substituting (8) in (7)

$$E = \frac{E_p - I_p Z_p}{\overline{N}\overline{N}_v} + \left\{\frac{\overline{N}}{\overline{N}_c} I_p\right\} \left\{\frac{Z_p \overline{N}_c}{\overline{N}^2 \overline{N}_v}\right\} - I_b Z_s = \frac{E_p}{\overline{N}\overline{N}_v} - I_b Z_s \quad (9)$$

However, the metering voltage E is equal to the voltage drop through the meter burden $$E = I_b Z_b$$

$$I_b = \frac{E}{Z_b} \quad (10)$$

Substituting (10) in (9)

$$E = \frac{E_p}{\overline{N}\overline{N}_v} - \frac{E}{Z_b} Z_s$$

$$E_p = E\left\{1 + \frac{Z_s}{Z_b}\right\} \overline{N}\overline{N}_v \quad (11)$$

As the factors $\overline{N}$ and $\overline{N}_v$ of (11) are real, $E_p$ and E will have the same phase angle only if the remaining factor $$\left(1 + \frac{Z_s}{Z_b}\right)$$

is real. The factor $$\left(1 + \frac{Z_s}{Z_b}\right)$$

will be real if the impedances $Z_s$ and $Z_b$ have the same impedance phase angle. In this event, the phase angle of the ratio $$\frac{Z_s}{Z_b}$$

is zero and the entire quantity $$\left(1 + \frac{Z_s}{Z_b}\right)$$

reduces to a real scalar. It will be seen, therefore, that phase agreement between the primary impressed voltage $E_p$ and the meter bus voltage E may be established by making the impedance $Z_s$ equal in impedance phase angle to the burden impedance $Z_b$.

The voltage drop in the impedance $Z_s$ reduces the metering voltage E from its desired value of $$\frac{E_p}{\overline{N}\overline{N}_v}$$

by the factor $$\left(1 + \frac{Z_s}{Z_b}\right)$$

as indicated in Equation (11). In order to establish the voltage E at its correct absolute magnitude, the turn ratio of the potential transformer 5 may be reduced from its uncorrected value $\overline{N}_v$ to a corrected value $\overline{N}_{vv}$ such that $$\overline{N}_{vv} = \overline{N}_v \left\{\frac{Z_b + Z_s}{Z_b}\right\} \quad (12)$$

Substituting the value of $\overline{N}_v$ from (12) in (11)

$$E_p = E \overline{N}\overline{N}_{vv} \quad (13)$$

showing the correspondence of E and $E_p$ in magnitude and phase angle. If $Z_s$ is small compared to $Z_b$, the factor $$\frac{Z_b + Z_s}{Z_b}$$

may be represented as $$1 - \frac{Z_s}{Z_b}.$$

Fig. 3 shows one method of introducing the correction factors calculated above. In this figure, the principal circuit elements and the compensator 6 are similar to the corresponding elements of Fig. 1 and are designated by the same reference numerals. The potential transformer 5, however, has a ratio equal to $$\frac{\overline{N}_o}{N}\left\{\frac{Z_b}{Z_b + Z_s}\right\}$$

where $\overline{N}_o$ is the overall desired transformation ratio between the high voltage bus 1 and the metering bus 7, and the remaining quantities are as listed above.

An adjustable impedance 15 is included in the secondary circuit of the potential transformer 5. The impedance 15 serves to permit adjustment of the impedance phase angle of the secondary circuit of potential transformer 5, so that the impedance $Z_s$ has the same impedance phase angle as the burden impedance $Z_b$ (corresponding to the devices 8 and 9). The secondary leakage-impedance of the potential transformer 5 may be similarly taken into account, if of appreciable magnitude, by adjusting the impedance 15 to such a value that the impedance phase angle of the entire secondary circuit of transformer 5 is the same as that of the burden $Z_b$. If the impedance $Z_s$ of the compensator 6 has approximately the same phase angle as the burden impedance $Z_b$, the impedance device 15 may be omitted, and the ratio correction of transformer 5 relied upon for compensation of the burden error.

In the arrangement shown in Fig. 3, the voltage at the bus 1 is duplicated in miniature at the bus 7. It is possible, accordingly, to measure power quantities of other circuits connected to the bus 1 by means of the potential of the potential bus 7. For example, a load, indicated diagrammatically as a transformer 44, may be metered on the wattmeter 9 by energizing the current coils of the meter in accordance with the load current, as by means of a current transformer 45.

The relationship of Equation (19) may be used to obtain phase agreement of the voltages $E_p$ and $E$ in a different way if polyphase voltages are available, as illustrated in Fig. 5. In the arrangement shown in the latter figure, the potential transformer ratio $N_{vv}$ is treated as a vector and is made of such value that $$N_{vv} = \frac{\overline{N}_o}{N}\left\{1 - \frac{Z_s}{Z_b}\right\}$$

regardless of whether the impedances $Z_b$ and $Z_s$ have the same phase angle or not. As the latter impedances ordinarily do not have the same phase angle, the turn ratios $N_{vv}$ calculated in this way have complex values. These complex values are obtained in practice by means of auxiliary windings or the potential transformers. In Fig. 5, potential transformers 20a and 20b, which are shown as connected in open V but which may be connected in any usual manner, are provided with auxiliary windings 20aa and 20bb for producing dephased voltages. The auxiliary windings 20aa and 20bb are connected in series with secondary windings of the other phase so as to produce the equivalent of complex turn ratios.

In some applications, it may be convenient to provide a separate potential bus for those devices which respond to reactive quantities, such as reactive volt-ampere meters. In such applications, substantial reduction of the burden error for devices responsive to real power such as wattmeters or watthour meters may be effected by means of the circuit shown in Fig. 4.

In Fig. 4, the principal circuit elements are similar to the corresponding elements of Figs. 1 and 3 and are denoted by the same reference characters. In place of one potential bus 7, however, a reactive potential bus 16 and a power potential bus 17 are provided.

The mutual impedance of the compensator 6, instead of being introduced serially in the secondary circuit of potential transformer 5, is divided into separate resistance and reactance portions 12 and 13 which are included separately in series with the reactive bus 16 and power bus 17, respectively.

The reactance section 13 has the same reactance value, calculated from the reactance of the transformer 4 and the turn ratios of the instrument transformers 5 and 11, as in Fig. 3. The resistance section 12, however, is of lower value than the corresponding resistance section of Fig. 3. For example, the resistance section 12 of Fig. 4 may have one-fourth the value of the corresponding section 12 of Fig. 3. With such a resistance value, the ratio of the auxiliary potential transformer 10 is made 40:1 instead of 10:1 in order to produce the same voltage drop in the meter circuit per ampere of line current. Although the mutual resistance drop of the resistance section 12 remains the same considered from the line circuit side, the increased ratio of potential transformer 10 reduces the secondary resistance of the compensator 6 to the burden current supplied to bus 17. In the instance given, the reduction is approximately 4:1. The error produced by the impedance drop of the burden current through the secondary impedance of the compensator 6 is, accordingly, substantially eliminated from the reading of the wattmeter 9, although this error remains in the reading of the reactive volt-ampere meter 8. In the majority of applications, extreme accuracy is necessary only in the real power measurements, and a much lower degree of accuracy suffices for reactive power measurements.

The circuit of Fig. 4 presupposes that resistance compensation only is necessary for the real power bus 17, and that reactive compensation only is necessary for the reactive power bus 16. This may be shown as follows, letting $E'$ = voltage of bus 16
$E''$ = voltage of bus 17
$I'_b$ = burden current supplied to bus 16
$I''_p$ = burden current supplied to bus 16
$R_p$ = resistance component of impedance $Z_p$
$X_p$ = reactance component of impedance $Z_p$
$R_s$ = resistance component of impedance $Z_s$
$X_s$ = reactance component of impedance $Z_s$
$w$ = the frequency constant
$j$ = the imaginary $\sqrt{-1}$
$t$ = time
$P$ = real power reading of meter 9
$Q$ = reactive power reading of meter 8
$R[f(EI)]$ = real component of complex function of $f(EI)$
$I[f(EI)]$ = imaginary component of complex function of $f(EI)$ The symbols $E_p$, $Z_p$, etc., denote the same quantities as listed above in connection with Fig. 2.

The voltage at bus 16, in terms of the transformer primary voltage $E_p$ and impedance drops, is $$E' = E_p - I_p(R_p + jX_p) + jI_pX_p - jI'_bX_s \quad (14)$$

Similarly, the voltage at bus 17 is $$E'' = E_p - I_p(R_p + jX_p) + I_pR_p - I''_bR_s \quad (15)$$

Equations (14) and (15) express the relationship of vector variables $E_p$, $I_p$ which are conventially accepted as equivalent to the electrical variables in the circuit. Actually, the electrical variables are alternating scalar quantities of the form $$(E_p + \hat{E}_p)$$

and $$(I_p + \hat{I}_p)$$

where the quantities without the circumflex accent are rotating vectors of the form $$\frac{E_p}{2}e^{iwt}$$

and the accented quantities are oppositely rotating vectors of the form $$\frac{\bar{E}_p}{2}e^{-iwt}.$$

A complete expression of the electrical variables should, therefore, include an equation of the conjugate quantities $$\hat{E}_p, \hat{I}_p,$$

etc. However, for most calculations, the conjugate equation expresses merely the same relationship as the simple vector equation, and is, therefore, omitted. In the calculation of power quantities, however, the conjugate variables are convenient in distinguishing double frequency power terms which have an average value of zero and do not affect meter readings, from the zero frequency terms which appear upon the meters.

Substitution of the exponential forms in various power products will show that quantities of the form $\hat{E}I$ and $E\hat{I}$ produce scalar or zero frequency products which appear on the meters, whereas terms of the form $EI$ or $\hat{E}\hat{I}$ are of double frequency.

With the above conception in mind, the real and reactive power readings at the buses 16 and 17 may be conveniently calculated from Equations (14) and (15) as follows: The meters 8 and 9 are provided with current coils (not shown) which are energized in accordance with a line current variable such as $(I_p + \hat{I}_p)$, by means of current transformer apparatus (not shown) in the usual manner. As only the conjugate part $\hat{I}_p$ of the current variable will produce a meter reading with the unaccented vectors of Equations (14) and (15), the real and reactive power readings at the buses 16 and 17, respectively, may be taken as the real and reactive components of the product of the conjugate current $\hat{I}_p$ and the corresponding bus voltage $E'$ or $E''$.

The reactive power meter reading at bus 16 is
$$Q = I[E'\hat{I}_p] \quad (16)$$

The real power meter reading at bus 17 is
$$P = R[E''\hat{I}_p] \quad (17)$$

Substituting (14) in (16)
$$Q = I[E_p\hat{I}_p - I_p\hat{I}_p(R_p + jX_p) + jI_p\hat{I}_pX_p - j\hat{I}_pI'_bX_s] = I[E_p\hat{I}_p - j\hat{I}_pI'_bX_s] \quad (18)$$

Substituting (15) in (17)
$$P = R[E_p\hat{I}_p - I_p\hat{I}_p(R_p + jX_p) + I_p\hat{I}_pR_p - \hat{I}_pI''_bR_s] = R[E_p\hat{I}_p - \hat{I}_pI''_bR_s] \quad (19)$$

From (19) it appears that the meter real power reading corresponds exactly to the true real power $R[E_p\hat{I}_p]$ except for the error caused by the voltage drop $I'_bR_s$ of the burden current in the compensator equivalent secondary resistance $R_s$. As the terms $I'_bR_s$ is made negligibly small in the manner explained above, the burden error is substantially eliminated.

Similarly, Equation (18) shows that the reactive compensation completely eliminates the error in reactive power reading caused by the transformer impedance $Z_p$, leaving only the error caused by burden impedance.

Although the invention has been shown in connection with single-phase circuits and apparatus, it will be apparent that it is equally applicable to polyphase circuits and apparatus. It will also be apparent that the potential transformers shown serve merely as mutual impedance devices, and that other equivalent mutual impedance devices may be substituted without the exercise of invention.

I do not intend that the present invention shall be limited to the specific structural details, arrangement of parts or circuit connections herein set forth as various modifications thereof may be effected without departing from the spirit and scope of my invention. I desire, therefore, that only such limitations shall be imposed as are indicated in the appended claims.

I claim as my invention:

1. In an alternating-current system, a high-voltage alternating-current circuit, a low-voltage alternating-current circuit, a power transformer having a turn ratio
$$\bar{N}$$
connected between said circuits, a potential circuit, a burden having impedance $Z_b$ connected to said potential circuit, and energizing means for said potential circuit having an overall transformation ratio
$$\bar{N}_o$$
from said high-voltage circuit, said energizing means including a compensating device energized in accordance with a current condition of said power transformer for applying a mutual-impedance voltage drop to said potential circuit, said compensating device having secondary impedance $Z_s$, and a mutual impedance device for applying reduced voltage from said low-voltage circuit to said potential circuit, said device having a no-load transformation ratio
$$\bar{N}_{vv}$$
of substantially
$$\bar{N}_{vv} = \frac{\bar{N}_o}{\bar{N}}\left(\frac{Z_b}{Z_b + Z_s}\right)$$

2. In an alternating-current system, a high-voltage alternating-current circuit, a low-voltage alternating-current circuit, a power transformer having a turn ratio
$$\bar{N}$$
connected between said circuits, a potential circuit, a burden having impedance $Z_b$ connected to said potential circuit, and energizing means for said potential circuit having an overall transformation ratio
$$\bar{N}_o$$
from said high-voltage circuit, said energizing means including a compensating device energized in accordance with a current condition of said power transformer for applying a mutual impedance voltage drop to said potential circuit, said compensating device having secondary impedance $Z_s$ of substantially the same phase angle as the burden impedance $Z_b$, and a mutual impedance device for applying reduced voltage from said low voltage circuit to said potential circuit, said device having a no-load transformation ratio $\bar{N}_{vv}$ of substantially $$\bar{N}_{vv} = \frac{\bar{N}_o}{\bar{N}}\left(\frac{Z_b}{Z_b + Z_s}\right)$$

3. In an alternating-current system, a high-voltage alternating-current circuit, a low-voltage alternating-current circuit, a power transformer having a turn ratio $\bar{N}$ connected between said circuits, a potential circuit, a burden having impedance $Z_b$ connected to said potential circuit, and energizing means for said potential circuit having an overall transformation ratio $\bar{N}_o$ from said high-voltage circuit, said energizing means including a compensating device energized in accordance with a current condition of said power transformer for applying a mutual-impedance voltage drop to said potential circuit, said compensating device having secondary impedance $Z_s$ small as compared to the burden impedance $Z_b$, and a mutual impedance device for applying reduced voltage from said low-voltage circuit to said potential circuit, said device having a no-load transformation ratio $\bar{N}_{vv}$ of substantially $$\bar{N}_{vv} = \frac{\bar{N}_o}{\bar{N}}\left(1 - \frac{Z_s}{Z_b}\right)$$

4. In an alternating-current system, a high-voltage alternating-current circuit, a low-voltage alternating-current circuit, a power transformer having a turn ratio $\bar{N}$ connected between said circuits, a potential circuit, a burden having impedance $Z_b$ connected to said potential circuit, and energizing means for said potential circuit having an overall transformation ratio $\bar{N}_o$ from said high-voltage circuit, said energizing means including a compensating device energized in accordance with a current condition of said power transformer for applying a mutual-impedance voltage drop to said potential circuit, said compensating device having adjustable means for causing the secondary impedance $Z_s$ thereof to coincide in impedance phase angle with the burden impedance $Z_b$ and a mutual impedance device for applying reduced voltage from said low-voltage circuit to said potential circuit, said device having a no-load ratio corrected from a value $\dfrac{\bar{N}_o}{\bar{N}}$ a sufficient amount to compensate for the voltage drop in the impedance $Z_s$ caused by burden current.

5. In an alternating-current system, an alternating-current circuit having equivalent series resistance and reactance associated therewith, a power potential circuit, a reactive potential circuit, resistance compensating means including in said power potential circuit, reactance compensating means included in said reactive potential circuit, and means responsive to a current condition derived from said alternating-current circuit for energizing said resistance compensating means and said reactance compensating means.

6. In an alternating-current system, an alternating-current circuit having equivalent series resistance and reactance associated therewith, a power potential circuit, a reactive potential circuit, resistance compensating means included in said power potential circuit, reactance compensating means included in said reactive potential circuit, means responsive to a current condition derived from said alternating-current circuit for energizing said resistance compensating means and said reactance compensating means, and mutual impedance means for applying reduced voltage derived from said alternating-current circuit to said power potential circuit and said reactive potential circuit.

EDWIN L. HARDER.